(12) United States Patent
Christiansen

(10) Patent No.: US 10,907,619 B2
(45) Date of Patent: Feb. 2, 2021

(54) LIGHTNING PROTECTION SYSTEM FOR A ROTOR BLADE WITH A WINGLET

(71) Applicant: Siemens Gamesa Renewable Energy A/S, Brande (DK)

(72) Inventor: Thomas Lehrmann Christiansen, Aalborg (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 93 days.

(21) Appl. No.: 16/346,953

(22) PCT Filed: Oct. 17, 2017

(86) PCT No.: PCT/EP2017/076502
§ 371 (c)(1),
(2) Date: May 2, 2019

(87) PCT Pub. No.: WO2018/082916
PCT Pub. Date: May 11, 2018

(65) Prior Publication Data
US 2020/0056595 A1 Feb. 20, 2020

(30) Foreign Application Priority Data
Nov. 4, 2016 (DE) .......................... 10 2016 221 672

(51) Int. Cl.
*F03D 1/00* (2006.01)
*F03D 80/30* (2016.01)
*F03D 1/06* (2006.01)

(52) U.S. Cl.
CPC ........... *F03D 80/30* (2016.05); *F03D 1/0633* (2013.01); *F03D 1/0675* (2013.01); *F05B 2230/80* (2013.01); *F05B 2260/962* (2013.01)

(58) Field of Classification Search
CPC ...... F03D 80/30; F03D 1/0675; F03D 1/0633; F05D 2240/307; F05B 2240/307
See application file for complete search history.

(56) References Cited

U.S. PATENT DOCUMENTS

| 4,774,622 A | 9/1988 | Shirakawa et al. |
| 8,177,509 B2 * | 5/2012 | Hansen ................... F03D 80/30 416/146 R |

(Continued)

FOREIGN PATENT DOCUMENTS

| CN | 87106916 A | 4/1988 |
| CN | 103016279 A | 4/2013 |

(Continued)

OTHER PUBLICATIONS

Dvorak Paul: "How segmented lightning diverters improve blade protection", XP055449319, Retrieved from the Internet: URL:https://www.windpowerengineering.com/environmental/how-segmented-lightning-diverters-improve-blade-protection/ [retrieved on Feb. 8, 2018] paragraphs [0006]- [0008] figures 1-3; 2013.

(Continued)

*Primary Examiner* — Ninh H. Nguyen
(74) *Attorney, Agent, or Firm* — Schmeiser, Olsen & Watts LLP

(57) ABSTRACT

A rotor blade of a wind turbine, the rotor blade including a winglet and a lightning protection system with at least one lightning receptor is provided. The lightning receptor is located at the tip section of the rotor blade. Additionally, the rotor blade includes at least one lightning diverter containing an electrically conductive material, wherein the lightning diverter terminates at the lightning receptor and is located at least partially on the surface of the winglet.

15 Claims, 5 Drawing Sheets

(56) References Cited

U.S. PATENT DOCUMENTS

Figure 1:
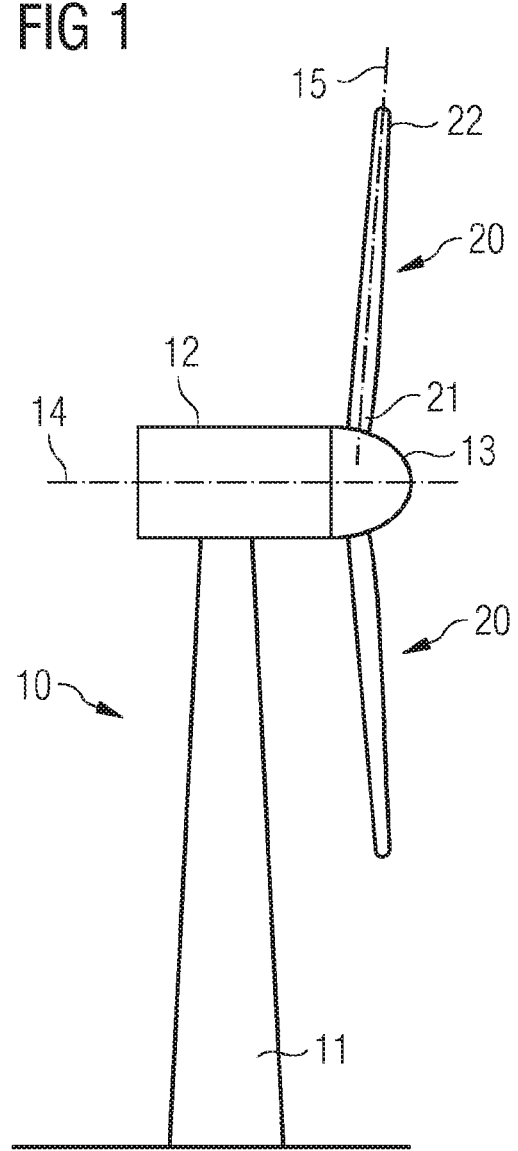

| | | | | |
|---|---|---|---|---|
| 8,289,672 | B2* | 10/2012 | Dahl | ................ H02G 13/80 |
| | | | | 361/218 |
| 10,443,579 | B2* | 10/2019 | Tobin | .................. F03D 1/0675 |
| 2009/0246025 | A1 | 10/2009 | Lewke et al. | |
| 2016/0090963 | A1* | 3/2016 | Hoffmann | ............... F03D 80/30 |
| | | | | 416/223 R |
| 2016/0131111 | A1 | 5/2016 | Olesen | |

FOREIGN PATENT DOCUMENTS

| | | |
|---|---|---|
| CN | 104153950 A | 11/2014 |
| CN | 204258037 U | 4/2015 |
| CN | 204663759 U | 9/2015 |
| CN | 105392986 A | 3/2016 |
| CN | 105545615 A | 5/2016 |
| CN | 105756864 A | 7/2016 |
| EP | 2416005 A1 | 2/2012 |
| EP | 3037655 A1 | 6/2016 |
| JP | 2007138765 A | 6/2007 |
| KR | 20100055594 A | 5/2010 |

OTHER PUBLICATIONS

International Search Report for PCT/EP2017/076502.
Written Opinion for PCT/EP2017/076502.

* cited by examiner

LIGHTNING PROTECTION SYSTEM FOR A ROTOR BLADE WITH A WINGLET

CROSS-REFERENCE TO RELATED APPLICATIONS

This application claims priority to PCT Application No. PCT/EP2017/076502, having a filing date of Oct. 17, 2017, which is based on German Application No. 10 2016 221 672.4, having a filing date of Nov. 4, 2016, the entire contents both of which are hereby incorporated by reference.

FIELD OF TECHNOLOGY

The following relates to a rotor blade of a wind turbine, the rotor blade comprising a winglet and a lightning protection system. Furthermore, the following relates to a method to improve a lightning protection system of a rotor blade of a wind turbine with a winglet.

BACKGROUND

Rotor blades of a wind turbine are sometimes equipped with winglets. The purpose of a winglet is to improve the aerodynamic efficiency of the rotor blade and/or to reduce the noise which is generated by the interaction of the airflow impinging on the rotor blade and the rotor blade itself.

Lightning strikes are generally a serious challenge for wind turbines, in particular with the ever-growing size of wind turbines, as seen by the increasing height of the hub of the wind turbine and/or the increasing length of the rotor blades. As the winglet is arranged at the tip section of the rotor blade, winglets are highly exposed to lightning strikes. As a result, lightning damage is seen relatively frequently on winglets of wind turbine rotor blades.

Current winglets mostly do not comprise any specific lightning protection system. Instead, the outmost lightning receptor of the generally several lightning receptors of a rotor blade is placed as most as possible outwards towards the tip of the rotor blade, but not at the winglet itself.

For existing rotor blades which are retrofitted with a winglet, a reason for not adding an internal lightning protection system in the winglet is, for instance, that the rotor blade already has a built-in lightning protection system and that it is relatively complicated to connect a built-in lightning protection system of a winglet with the existing lightning protection system of the existing rotor blade.

As a consequence, the winglet as such generally remains unprotected against lightning strikes. This is, however, accepted at the current stage.

An approach to better protect the winglet against lightning strikes has been disclosed in the European Patent Application EP 2 416 005 A1. Therein it is proposed to provide a lightning protection system which is integrated in the winglet and connected to the lightning protection system of the remaining rotor blade. In other words, a lightning receptor is specifically arranged at the winglet itself, wherein the lightning receptor of the winglet is connected to the overall lightning protection system of the rotor blade.

An advantage of this concept is that any lightning strike hitting the winglet is intercepted by the lightning receptor of the winglet, thus the risk of a damage to the structure of the winglet is reduced.

However, such a system is relatively complex and expensive to provide. Furthermore, it is complicated to add such a lightning protection system to an already existing winglet-equipped rotor blade as this would involve opening up the winglet for inserting the lightning receptor and lightning conductor.

SUMMARY

The embodiments of the present invention improve the current situation by providing a concept that efficiently protects a winglet of a rotor blade of a wind turbine against lightning strikes in a cost-efficient and reliable manner.

An aspect relates to a rotor blade of a wind turbine, wherein the rotor blade comprises a winglet and a lightning protection system. The lightning protection system comprises at least one lightning receptor, which is located at the tip section of the rotor blade. The rotor blade is furthermore characterized in that it comprises at least one lightning diverter containing an electrically conductive material, wherein the lightning diverter terminates at the lightning receptor and is located at least partially on the surface of the winglet.

A key aspect of embodiments of the present invention is that a specific lightning protection system for a winglet is provided without changing the structure, in particular the inner structure, of the winglet. For instance, the winglet does not need to be opened. Furthermore, no lightning receptor or lightning conductor needs to be integrated in the winglet. Instead, the existing lightning protection system of the rotor blade with a lightning receptor, which is already present at the tip section of the rotor blade, is used. In order to avoid that a lightning strike which reaches the rotor blade at its outermost part, namely the winglet, hits the rotor blade at the winglet, there is provided a so-called lightning diverter which guides the lightning strike towards the lightning receptor at the tip section of the rotor blade.

Lightning diverters are in principle known from the aircraft industry as a means to guide lightning strikes to a preferred location on the aircraft. These lightning diverters are in principle also in use for wind turbine blades, but they have exclusively been applied to the rotor blade body, i.e. the main straight part of the rotor blade. The application of lightning diverters to a winglet of a rotor blade has never been realized on a product level or thought of in literature. Although the problem of lightning strikes hitting particularly the winglet of a rotor blade is known for many years, the idea of providing and attaching lightning diverters on the surface of the winglet and thus guiding a potential lightning strike from the winglet towards the main part of the rotor blade has not been disclosed until now. It is the merit of the present inventor having conceived to apply at least one lightning diverters, such as a lightning diverter strip, on the surface of a winglet and thus providing a simple, cost-efficient and reliable means to protect the winglet against lightning strikes.

The lightning diverter may be designed and configured in various ways. In order to fulfill its predestined purpose, the lightning diverter contains an electrically conductive material. It is also necessary that the lightning diverter somehow terminates at the lightning receptor, although it is not necessary that the lightning diverter is in direct contact with the lightning receptor. As an alternative, the lightning diverter may also just terminate in the vicinity of the lightning receptor and still fulfill its purpose of guiding a lightning to the lightning receptor.

In embodiments of the invention, the lightning diverter is an elongated member comprising a length which is at least three times greater than its width, in particular comprising a length, which is more than five times greater than its width.

As advantageously the lightning diverter is designed as an elongated member having a length which is significantly larger than its width, lightning diverters are also referred to as "lightning diverter strips" or simply "diverter strips". As, conventionally, most lightning diverters are made of a plurality of isolated segments, lightning diverters are also referred to as "segmented lightning diverter strips". The reason why the lightning diverter is advantageously designed as an elongated member is that by this a predefined path for the lighting strike is provided.

Apart of the ratio of the length and the width of the lightning diverter, the length of the lightning diverter is advantageously chosen to have a value which is between 10% and 300% of the chord length of the rotor blade at the spanwise position of the lightning receptor. The chord length of the rotor blade at the spanwise position of the lightning receptor is meant to be the length of the chord line of the airfoil which comprises the lightning receptor at the tip section of the rotor blade. In other words, it is suggested that the lightning diverter has a minimum value of one tenth of the chord length of the rotor blade and a maximum value of three times of the chord length. Obviously, a relatively large length of two to three times of the chord length is only possible if the lightning diverter is oriented significantly inclined to the chord line of the rotor blade, such as being orientated in parallel to the spanwise direction of the rotor blade.

In another advantageous embodiment, the lightning diverter is arranged on a carrier, wherein the carrier in particular comprises a strip of polymer material.

Adding a carrier, i.e. a substrate, is beneficial in that the properties and design configuration of the lightning diverter containing the electrically conductive material can be optimized by its conductive properties and its properties how to ionize the air if the lightning diverter is hit by a lightning strike. In contrast, a strong and long-lasting attachment, e.g. adhesion, of the lightning diverter to the surface of the rotor blade is optimized and ensured by the carrier. Such a long-lasting and strong attachment of the lightning diverter to the surface of the rotor blade is not trivial as the winglet is generally exposed to harsh conditions due to the high speed at which the winglet is moves during operation of the wind turbine. Therefore, it needs to be ensured that the lightning diverter is safely connected to the surface of the rotor blade even during ice, rain, dust and dirt.

In another advantageous embodiment, the lightning diverter contains a plurality of isolated metal segments.

These isolated metal segments exemplarily have a circular shape with a few millimeters in diameter and are arranged next to each other in a row.

In yet another advantageous embodiment, the carrier is flexible such that it is capable to adapt to curved surfaces.

This is particularly useful as winglets of a rotor blade usually do have a significant curvature. The lightning diverters and, if applicable, the carrier upon which the lightning diverter is attached to, may be required to follow the curvature of the winglet.

In embodiments of the invention the lightning receptor is at least partially embedded into the shell of the rotor blade.

Such an embedded lightning receptor is a preferred option as it minimizes any adverse aerodynamic effects while still providing a good lightning reception capability. Note that the lightning receptor may be entirely embedded into the shell of the rotor blade such that its upper surface is flush with the (outer) surface of the rotor blade. Alternatively, the lightning receptor may comprise one part which protrudes from the surface of the rotor blade and another part which is embedded into the blade shell and connects the protruding part to e.g. a lightning down conductor.

The lightning receptor is usually connected to a block in the interior of the rotor blade and the block is connected with a lightning conductor cable which leads towards the root of the rotor blade and furthermore through the hub and the nacelle and the tower to the ground.

Regarding the design and the arrangement of the lightning diverters on the surface of the winglet, various design options are imaginable.

A first embodiment comprises the application of one single lightning diverter on each side of the winglet, namely the pressure side and the suction side.

A second embodiment is that only one of the two sides—either the suction side or the pressure side—is equipped with a lightning diverter.

Regarding the orientation of the lightning diverters, several options are present: The lightning diverter may be directed from the lightning receptor towards the tip of the winglet, wherein the tip of the winglet is equivalent with the tip of the rotor blade. This arrangement is based on the reasoning that the very tip of the rotor blade is a preferred region for lightning strikes. Note that the lightning diverter may be directed perfectly towards the tip of the rotor blade or it may be directed slightly away from this direction, namely including deviations of up to thirty degrees in both directions, either towards the trailing edge or towards the leading edge.

Alternatively, the lightning diverter may be directed towards the trailing edge. Again, the lightning diverter may point directly to the trailing edge. However, deviations up to thirty degrees either towards the tip of the rotor blade or towards the root of the rotor blade shall also be included in this preferred embodiment. A placement of the lightning diverter towards the trailing edge is beneficial because of the motion of the rotor blade. It has been observed that lightning strikes frequently hit, or sweep across, the rotor blade in the trailing edge region or, more generally, in the half of the rotor blade which is between its spanwise centerline and the trailing edge.

Yet another alternative consists in placing the lightning diverter in an angle between one hundred and twenty and one hundred and fifty degrees with respect to the trailing edge of the rotor blade at the spanwise position of the lightning receptor. In other words, the lightning diverter is orientated such that it points into the direction between the direction perpendicular to the trailing edge and towards the tip of the rotor blade.

Note that it is very well possible to provide several lighting diverters on the surface of the winglet. For instance, a first lightning diverter points substantially into the direction of the trailing edge, a second lightning diverter points into the direction of the tip of the rotor blade, and a third lightning diverter points into the direction between the first and the second lightning diverter.

If a lightning diverter is attached in the region of the leading edge and the leading edge has a leading-edge protection against erosion, it has to be taken into account that this leading-edge protection is not impacted adversely by the attachment of the lightning diverters.

Note that in principle any other orientation of the lightning diverter is well conceivable, too. The exact number and positioning of the lightning diverters are advantageously optimized with the specific geometric shape of the rotor blade and, optionally, with its planned installation site.

Winglets are usually attached separately to a rotor blade, because manufacturing of the rotor blade is significantly facilitated by manufacturing the winglet and the remaining rotor blade separately. In the case that the rotor blade comprises a rotor blade body and a winglet, which are made as separate pieces, the lightning receptor is advantageously be located at the rotor blade body. This has the advantage that no lightning receptors in the bent and curved winglet region need to be provided.

The embodiments are furthermore directed towards a method to improve a lightning protection system of a rotor blade of a wind turbine, wherein the rotor blade comprises a winglet and wherein the lightning protection system comprises at least one lightning receptor which is located at the tip section of the rotor blade. The method comprises the step of attaching at least one lightning diverter containing an electrically conductive material on the surface of the rotor blade, wherein the lightning diverter terminates at the lightning receptor and is located at least partially on the surface of the winglet.

In other words, there is disclosed a method how to improve a lightning protection system of a rotor blade of a wind turbine. The lightning protection system of the rotor blade is suggested to be improved by providing and attaching lightning diverters on the surface of the winglet.

These lightning diverters may be attached on the surface of the rotor blade as a retrofit. This means that the rotor blade may already be mounted to a hub of the wind turbine and the wind turbine may already be in operation. The present method allows retrofitting, in other words upgrading or improving, an already existing wind turbine. The attachment of the lightning diverters is easily possible. In practice this can be carried out by rope techniques, meaning that the rotor blade does not need to be dismounted from the hub. This heavily facilitates such a retrofit. Furthermore, attaching the lightning diverters to the surface of the winglet should in general be possible in a few minutes, such as in five to thirty minutes for each lightning diverter.

The lightning diverters are advantageously attached to the surface of the winglet by means of an adhesive, although in principle alternative connections such as a bolted connection are possible as well. However, an adhesive connection has the advantage that the laminate of the blade shell is not impacted.

BRIEF DESCRIPTION

Figure 2:
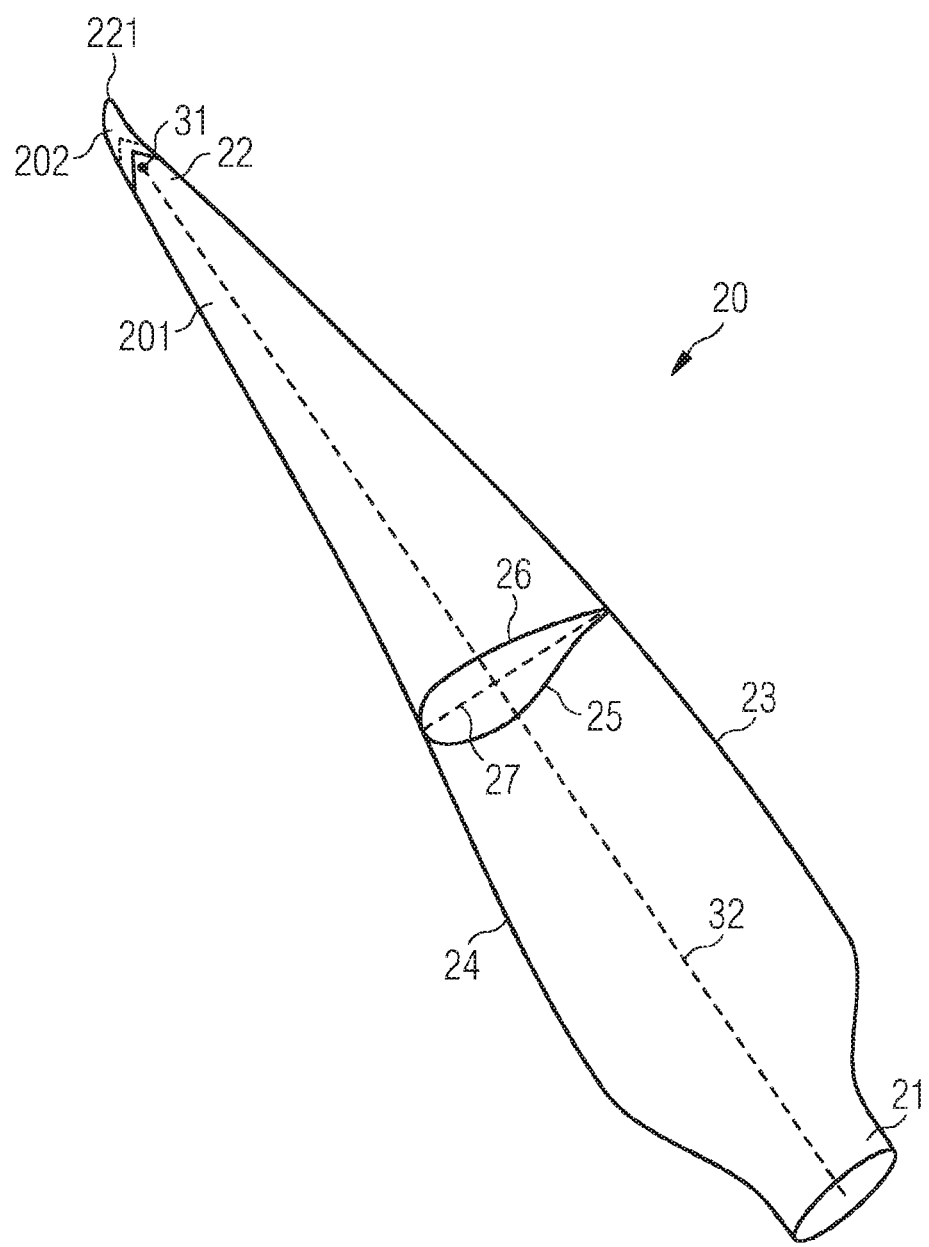
Figure 3:
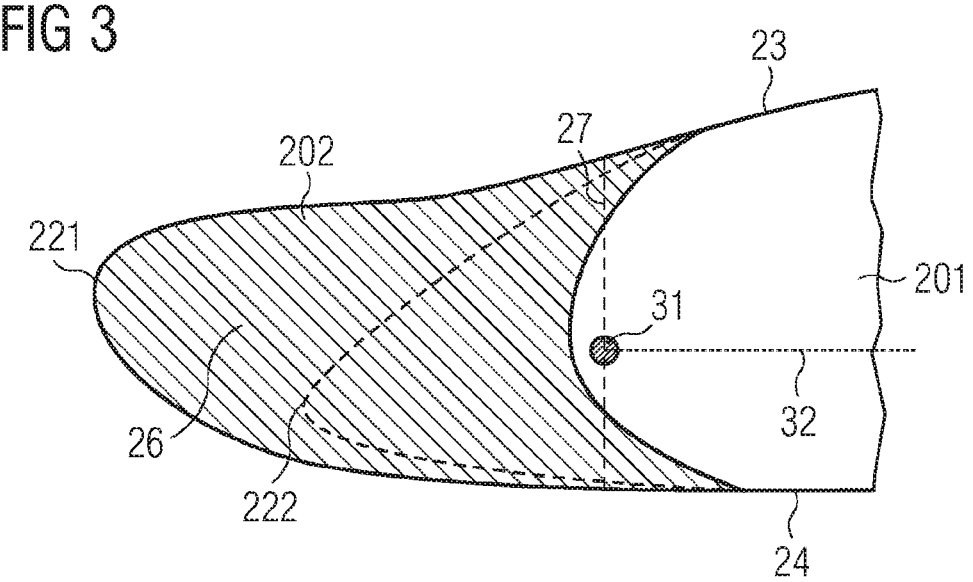
Figure 4:
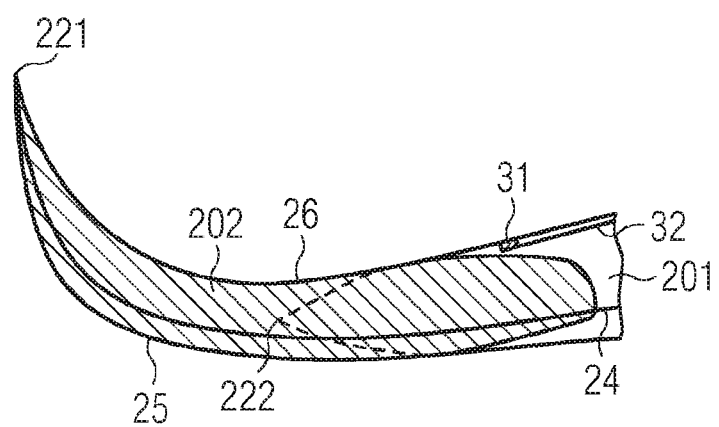
Figure 5:
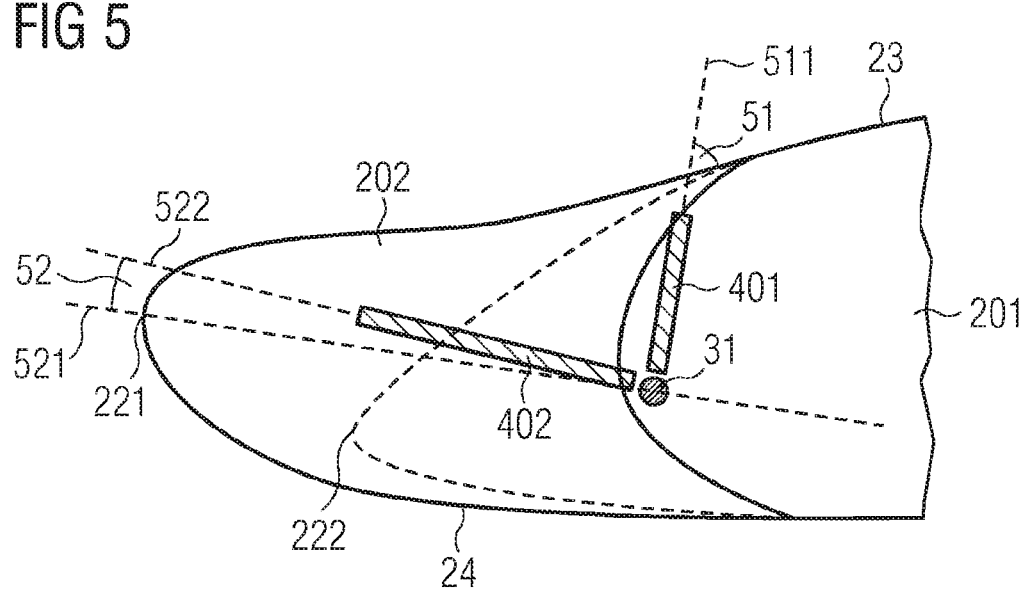
Figure 6:
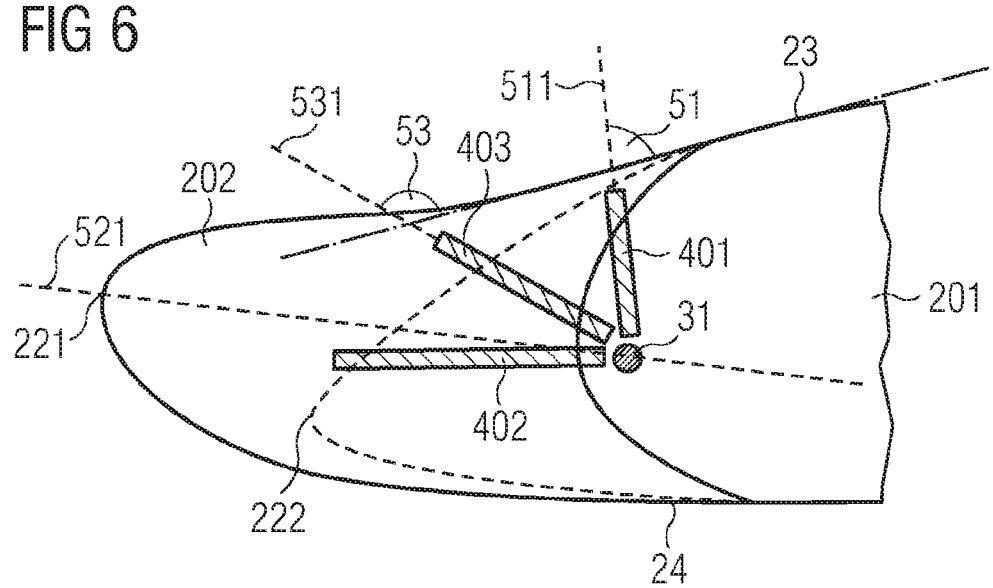
Figure 7:
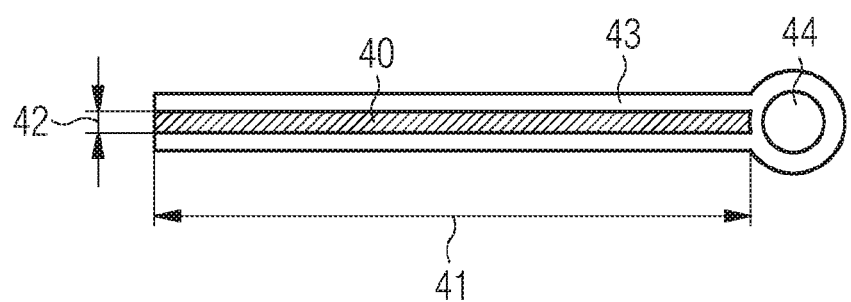
Figure 8:
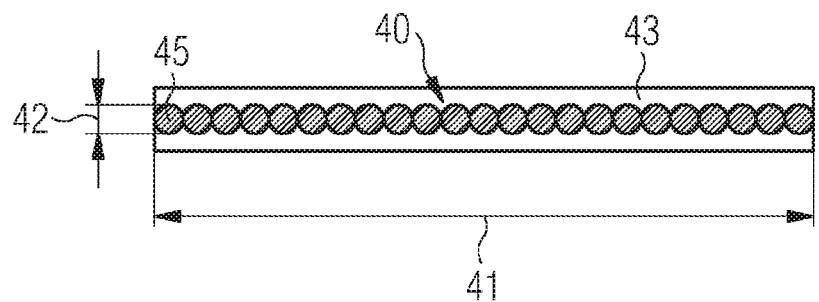

Some of the embodiments will be described in detail, with references to the following Figures, wherein like designations denote like members, wherein:

FIG. 1 shows a wind turbine;
FIG. 2 shows a rotor blade with a winglet;
FIG. 3 shows a close-up view of FIG. 2;
FIG. 4 shows the same section of the rotor blade as shown in FIG. 3 but seen from the side;
FIG. 5 shows a first example of a lightning diverter design;
FIG. 6 shows a second example of a lightning diverter design;
FIG. 7 shows a first example of a lightning diverter with a carrier; and
FIG. 8 shows a second example of a lightning diverter with a carrier.

The drawings are in schematic form. Note that same or similar elements are referenced by the same reference signs.

DETAILED DESCRIPTION

FIG. 1 shows a wind turbine 10 for generating electricity. The wind turbine 10 comprises a tower 11. At the top of the tower 11, there is provided a nacelle 12. The nacelle 12 is mounted rotatable about a substantially vertical axis, a so-called yaw axis. The nacelle 12 accommodates a generator and several other components of the wind turbine 10. The generator transforms the rotational energy of the rotor into electricity. The rotor comprises a substantially horizontal axis about which it can rotate. The rotational axis of the rotor is referenced by the reference sign 14. One part of the rotor is the hub 13 of the wind turbine. A plurality of rotor blades 20 are mounted to the hub 13. Each rotor blade 20 is typically mounted rotatable, i.e. pivotable, such that the rotor blade 20 can be pitched about a pitch axis 15. This greatly facilitates control and optimization of the wind turbine. The rotor blade 20 comprises a root section 21 at which it is mounted to the hub 13 and a tip section 22 at its opposed end. The exemplary wind turbine 10 of FIG. 1 comprises three rotor blades 20, of which two rotor blades 20 are illustrated here.

FIG. 2 shows a rotor blade 20 of a wind turbine in a perspective view. Again, the rotor blade 20 comprises a root section 21 and a tip section 22. In general, the root section comprises up to 10% of the total length of the rotor blade. In this context, the length of the rotor blade is seen as the distance and the extension of the rotor blade from the root to the tip. This is also described as the spanwise extension of the rotor blade. Likewise, the tip section 22 comprises the whole area at the tip of the rotor blade, including a spanwise extension up to 10% towards the root section 21.

The rotor blade furthermore comprises a trailing edge 23 and a leading edge 24. Typically, the leading edge 24 is relatively round, while the trailing edge 23 is relatively sharp. Alternatively, especially in the inboard section, the trailing edge may also be blunt. In order to generate lift the rotor blade 20 has airfoil profiles in most of its sections. One airfoil profile is depicted in FIG. 2. It illustrates the chord 27 which is also referred to as "chord line". The chord 27 reaches from the leading edge 24 to the trailing edge 23 of the airfoil profile. Furthermore, the pressure side 25 and the suction side 26 can be seen in FIG. 2. Note, that the entire rotor blade 20 comprises a plurality of such airfoils which typically smoothly change its shape from the root section 21 to the tip section 22.

FIG. 2 is a specific type of a rotor blade, as it comprises not only a rotor blade body 201, but also a winglet 202. The rotor blade body 201 and the winglet 202 are made as separate pieces, which after the respective manufacturing are joined, i.e. attached, with each other. The winglet 202 has a curved, i.e. a bent shape. In the example of FIG. 2 it is a so-called suction side winglet as it is bent towards the suction side 26 of the rotor blade 20. Note, that the outermost point of the winglet 202 is referred to as the tip 221 which also represents the tip of the entire rotor blade.

Finally, FIG. 2 shows some components of the lightning protection system of the rotor blade, namely one of the lightning receptors 31 and a lightning conductor 32, which is connecting the lightning receptor 31 with the remaining lightning protection system.

FIGS. 3 and 4 show a close-up view of the tip section 22 of the rotor blade as shown in FIG. 2. FIG. 3 is a view onto the suction side of the tip section while FIG. 4 is a view onto the leading edge 24.

Starting with FIG. 3, it can be seen both the original rotor blade—here referenced by the rotor blade body 201—and the winglet 202. The winglet 202 prolongs the rotor blade in the spanwise direction and it also adds a certain bending or curvature out of the rotor blade plane as can be seen in FIG. 4. Both the tip of the rotor blade body 202 and the tip of the winglet 221 can be seen in FIGS. 3 and 4. Also the chord line 27 at the spanwise position of the lightning receptor 31 is drawn in FIG. 3. Lightning diverters are not yet shown, for sake of clarity. The lightning receptor 31 is at the outmost position of the rotor blade body 201, thus the lightning receptor 31 is still in a region which is not covered by the winglet 202. In the side view of the tip section, confer FIG. 4, it can also be seen that the lightning receptor 31 is an embedded lightning receptor which does not protrude from the surface and which is connected in its inner part with the lightning conductor 32.

FIGS. 5 and 6 show two examples how lightning diverters could be designed and arranged on the surface of the winglet of a rotor blade. Basically, the same tip section has been reproduced compared to FIGS. 3 and 4.

In FIG. 5, a first example comprising two lightning diverters, a first lightning diverter 401 and a second lightning diverter 402, are shown. The first lightning diverter 401 is aligned and directed substantially perpendicular to the trailing edge 23 of the rotor blade. A first angle 51 can be defined as the angle between the length axis 511 of the first lightning diverter 401 and the trailing edge. In the example as illustrated in FIG. 5, the first angle 51 is about twenty degrees. This is in the preferred range, which includes deviations up to thirty degrees in both directions—towards the root section and towards the tip of the rotor blade—relative to a perfectly perpendicular direction with respect to the trailing edge.

The second lightning diverter 402 is aligned and arranged with a second angle 52 with regard to the direction 521 towards the tip 221 of the rotor blade. In particular, the second angle 52 is defined as the angle between the direction 521 of the lightning receptor 31 towards the tip 221 of the rotor blade and the length axis 522 of the second lightning diverter 402. In the present example of FIG. 5, the second angle 52 also comprises approximately twenty degrees, therefore also being in a preferred range of plus/minus thirty degrees.

FIG. 6 shows a second example of an arrangement of lightning diverters, namely comprising a first lightning diverter 401, a second lightning diverter 402 and a third lightning diverter 403.

The first lightning diverter 401 is aligned perpendicular to the trailing edge 23. Thus, the angle 51 between the length axis 511 of the first lightning diverter 401 and the trailing edge 23 of the rotor blade 20 at the spanwise position of the lightning receptor 31 is eighty degrees.

The second lightning diverter 402 is arranged substantially parallel to the direction 521 of the lightning receptor 31 towards the tip 221 of the rotor blade, wherein the notion "substantially" includes deviations of up to thirty degrees.

Finally, the third lightning diverter 403 is arranged between the first lightning diverter 401 and the second lightning diverter 402. In particular, the angle 53 between the length axis 531 of the third lightning diverter 403 and the trailing edge 23 of the rotor blade 20 at the spanwise position of the lightning receptor 31 is one hundred and thirty-five degrees.

Finally, FIGS. 7 and 8 illustrate two examples of a lightning diverter 40, respectively.

FIG. 7 shows a first embodiment wherein the lightning diverter 40 is designed as a strip comprising a length 41 which significantly exceeds its width 42. Note that the lightning diverter 40 is arranged upon a carrier 43. This enables an optimum ability to attach the lightning diverter 40 to the surface of the winglet, for example by an adhesive connection. To give a concrete example, the lightning diverter 40 may comprise metallic elements, while the carrier 43 may be made of a polymer.

Regarding the dimensions, the width 42 of the lightning diverter 42 of the lightning diverter 40 is exemplarily four millimeters while the length 41 is twenty centimeters. The thickness of the lightning diverter 40 is less than one millimeter, for example 0.3 millimeter. Note that the width of the carrier 43 is obviously larger than the width of the lightning diverter and could in principle also fall below the length-to-width ratio of more than five.

As a supplemental feature, FIG. 7 shows that the carrier 43 has an eyelet 44 in order to facilitate alignment of the lightning diverter 40 with regard to the lightning receptor.

FIG. 8 shows a different embodiment of a lightning diverter 40. Herein, the lightning diverter 40 comprises a plurality of segments 45. Each segment 45 has a substantially circular shape in the plan view. Adjacent segments 45 are aligned one next to the other. Again, the length 41 and the width 42 of the lightning diverter 40 can be determined and advantageously lead to an elongated shape of the total lightning diverter.

The lightning diverter is also combined with a carrier 43 for facilitating attachment of the lightning diverter 40 to the surface of the rotor blade. Note that the lightning diverter 40 and its carrier 43 are designed without any eyelet. This has the advantage that the lightning diverter and carrier arrangement can be designed without taking the dimension of the respective lightning receptor into account.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A rotor blade of a wind turbine, comprising:
   a winglet;
   a lightning protection system with at least one lightning receptor, wherein the at least one lightning receptor is located at a tip section of the rotor blade; and
   at least one lightning diverter containing an electrically conductive material, wherein the at least one lightning diverter terminates at the at least one lightning receptor and is located at least partially on a surface of the winglet.

2. The rotor blade according to claim 1, wherein the at least one lightning diverter is an elongated member comprising a length which is at least three times greater than its width.

3. The rotor blade according to claim 2, wherein the length of the at least one lightning diverter has a value between 10% and 300% of a chord length of the rotor blade at a spanwise position of the at least one lightning receptor.

4. The rotor blade according to claim 1, wherein the at least one lightning diverter is arranged on a carrier, the carrier comprising a strip of polymer material.

5. The rotor blade according to claim 4, wherein the carrier is flexible such that the carrier is able to adapt to curved surfaces.

6. The rotor blade according to claim 1, wherein the at least one lightning diverter contains a plurality of isolated metal segments.

7. The rotor blade according to claim 1, wherein the at least one lightning diverter points from the at least one lightning receptor to a trailing edge of the rotor blade, wherein a first angle between a length axis of the at least one lightning diverter and the trailing edge is in a range between sixty and one hundred and twenty degrees.

8. The rotor blade according to claim 1, wherein the at least one lightning diverter points from the at least one lightning receptor to a tip of the rotor blade, including deviations of up to thirty degrees.

9. The rotor blade according to claim 1, wherein a length axis of the at least one lightning diverter comprises an angle between one hundred and twenty and one hundred and fifty degrees with a trailing edge of the rotor blade at a spanwise position of the at least one lightning receptor.

10. The rotor blade according to claim 1, further comprising a rotor blade body, wherein the rotor blade body and the winglet are made as separate pieces being attached to each other.

11. The rotor blade according to claim 10, wherein the lightning receptor comprises a portion which builds a part of the surface of the rotor blade body.

12. A method to improve a lightning protection system of a rotor blade of a wind turbine, the rotor blade comprising a winglet and the lightning protection system comprising at least one lightning receptor which is located at a tip section of the rotor blade, wherein the method comprises:

attaching at least one lightning diverter containing an electrically conductive material on a surface of the rotor blade, wherein the at least one lightning diverter terminates at the at least one lighting receptor and is located at least partially on a surface of the winglet.

13. The method according to claim 12, wherein the at least one lightning diverter is attached on the surface of the rotor blade as a retrofit.

14. The method according to claim 13, wherein the rotor blade is kept mounted on a hub of the wind turbine during the retrofit.

15. The method according to claim 12, wherein the at least one lightning diverter or a carrier carrying the at least one lightning diverter is attached on the surface of the rotor blade by means of an adhesive.

\* \* \* \* \*